United States Patent
Ying et al.

(10) Patent No.: US 10,222,966 B2
(45) Date of Patent: Mar. 5, 2019

(54) PARALLAX DISCRETE PAGE SCROLLING

(71) Applicant: Flipboard, Inc., Palo Alto, CA (US)

(72) Inventors: Charles Hugo Ying, Piedmont, CA (US); Michael Johnston, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 251 days.

(21) Appl. No.: 15/016,267

(22) Filed: Feb. 5, 2016

(65) Prior Publication Data
US 2016/0231894 A1    Aug. 11, 2016

Related U.S. Application Data

(60) Provisional application No. 62/114,054, filed on Feb. 9, 2015.

(51) Int. Cl.
*G06F 3/048*    (2013.01)
*G06F 3/0485*   (2013.01)

(52) U.S. Cl.
CPC .................... *G06F 3/0485* (2013.01)

(58) Field of Classification Search
CPC ................ G06F 3/0485; G06F 3/048
See application file for complete search history.

(56) References Cited

U.S. PATENT DOCUMENTS

| | | | | |
|---|---|---|---|---|
| 5,850,211 A * | 12/1998 | Tognazzini | ............. | G06F 3/013 345/158 |
| 6,337,694 B1 * | 1/2002 | Becker | ............. | G06F 3/04855 345/684 |
| 8,438,496 B1 * | 5/2013 | Hegde | ............. | G06F 3/0485 715/784 |
| 9,201,583 B2 * | 12/2015 | Hegde | ............. | G06F 3/0485 |
| 2002/0027565 A1 * | 3/2002 | Syukri | ............. | G06F 3/0485 345/684 |
| 2013/0235088 A1 * | 9/2013 | Miura | ............. | G09G 5/34 345/684 |
| 2015/0007016 A1 * | 1/2015 | Lee | ............. | G06F 3/0482 715/234 |
| 2015/0067557 A1 * | 3/2015 | Lee | ............. | G06F 3/0487 715/765 |
| 2015/0185833 A1 * | 7/2015 | Shiraishi | ............. | G06F 3/0488 345/156 |
| 2016/0147404 A1 * | 5/2016 | Keune | ............. | G06F 3/0485 715/784 |

* cited by examiner

*Primary Examiner* — Mahelet Shiberou
(74) *Attorney, Agent, or Firm* — Fenwick & West LLP

(57) ABSTRACT

An online content system, such as a digital magazine, provides scrollable content that can be advanced in discrete, full-page scrolling increments. Each page of the content may include text and one or more images. The online content system thus provides a page scrolling animation that minimizes the negative affect of fast-scrolling text on a user's experience. In the animation of a single page scroll, the text moves less than a full height of the page and the image(s) move the full height of the page (i.e., the current image moves completely off the page and the new image moves into position from a location completely off the page). During this animation, the image may pass over the text, covering the old text and revealing the new text as it moves into its final position. The old text may also fade out while the new text fades in.

16 Claims, 3 Drawing Sheets

PARALLAX DISCRETE PAGE SCROLLING

BACKGROUND

This invention relates generally to the presentation of information in an online system, and in particular to the display of content organized as discrete pages and navigation between the pages.

Scrolling through pages of content is widely implemented. Scrolling can enhance the experience of a viewer of content by graphically representing changes to content and providing an intuitive mechanism for navigating content. In many cases, scrolling content includes text. However, scrolling text moving across a screen can be difficult for a viewer to track, and is generally unpleasant for a viewer's eyes. In many cases, this problem is made worse by systems that scroll entire pages of content at a time (e.g., a digital magazine system), rather than scrolling just a portion of a page or just a few lines of text at a time.

SUMMARY

An online content system, such as a digital magazine, provides scrollable content that can be advanced in discrete, full-page scrolling increments. Each page of the content may include text and one or more images. The online content system thus provides a page scrolling animation that minimizes the negative effect of fast-scrolling text on a user's experience. In the animation of a single page scroll, the text moves less than a full height of the page and the image(s) move the full height of the page (i.e., the current image moves completely off the page and the new image moves into position from a location completely off the page). During this animation, the image may pass over the text, covering the old text and revealing the new text as it moves into its final position. The old text may also fade out while the new text fades in. The animation may be implemented in a native application or in a web page.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, a tablet, or any other suitable computing system) and presented to the user. The digital magazine application may be a web-based application or a standalone application. Based on selections made by the user and/or on behalf of the user, the digital magazine server generates a digital magazine including one or more sections including content items retrieved from a number of sources and personalized for the user. The generated digital magazine allows the user to more easily consume content that interests and inspires the user by presenting content items in an easily navigable interface via a mobile computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine. In one embodiment, content is displayed on pages that advance in discrete, full-page scrolling increments.

Figure 1:
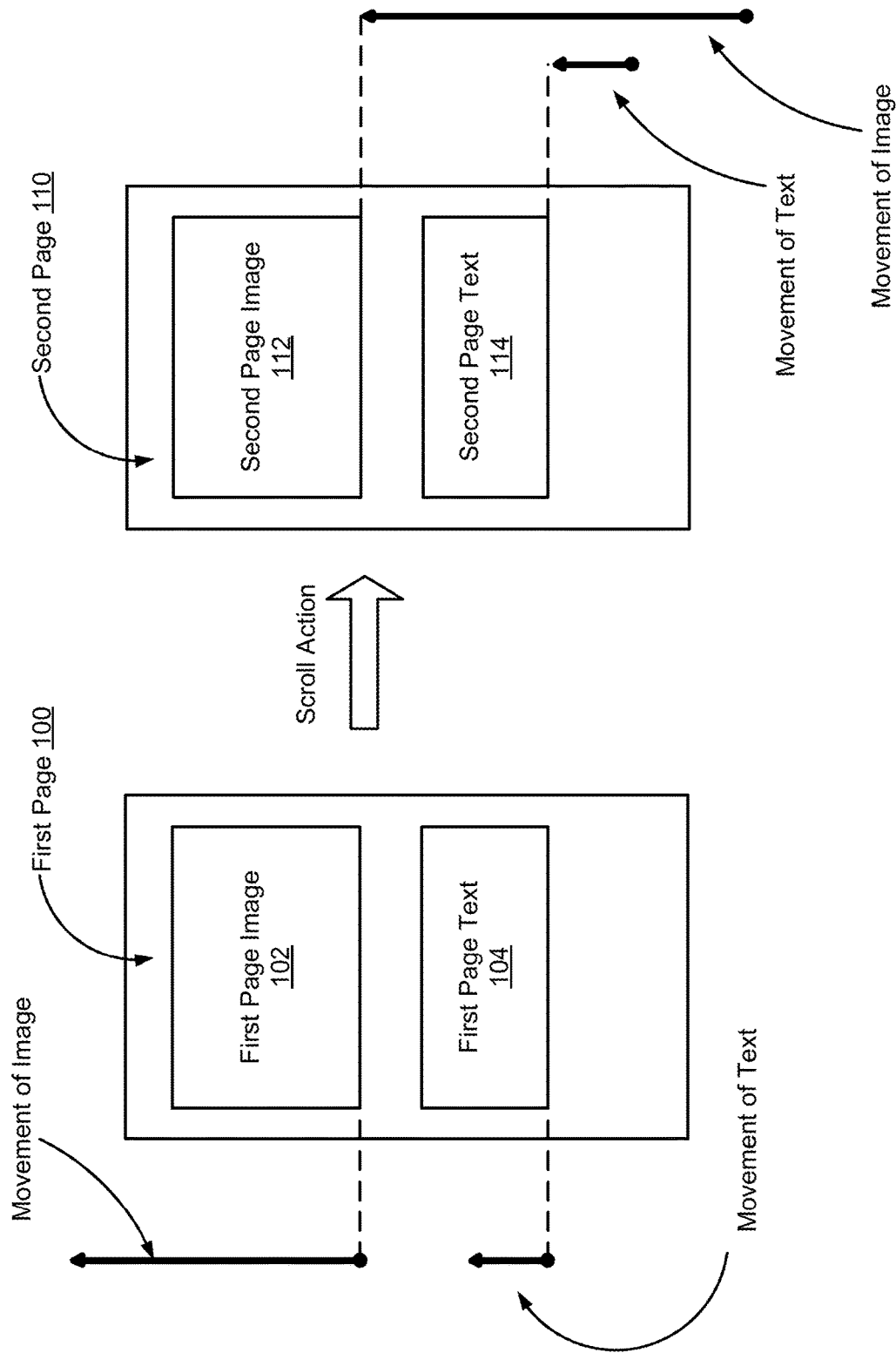
FIG. 1 is an illustration of first and second pages, each page containing text and image content, the first page scrollable to the second page, according to one embodiment.

FIG. 1 is an illustration of first and second pages, each page containing text and image content, the first page scrollable to the second page, according to one embodiment. In various embodiments, the first page 100 contains a first page image 102 and a first page text component 104. The second page 110 contains a second page image 112 and a second page text component 114. The first page 100 is scrollable to the second page 110 by a scroll action. In one embodiment, the images and the text components each have an associated movement related to the scroll action. In one embodiment, the movement occurs along a vertical axis of the pages, as indicated by the arrows in FIG. 1. In another embodiment, the movement occurs along a horizontal axis of the pages. In one embodiment, the movement of the images 102, 112 occurs on a different visual plane than the movement of the text components 104, 114. In one embodiment, the movement of the images 102, 112 occurs at a different speed than the movement of the text 104, 114 (e.g., the image moves from the bottom to the top of the first page while the text only moves a fraction of that distance). This creates a parallax effect, with the images in the foreground and the text in the background. The parallax effect accomplishes the discrete "page turn" advancement of pages of the content being consumed, but avoids the fast movement of text across the entire screen, thereby improving the user experience.

Scrolling Animation

Figure 2:
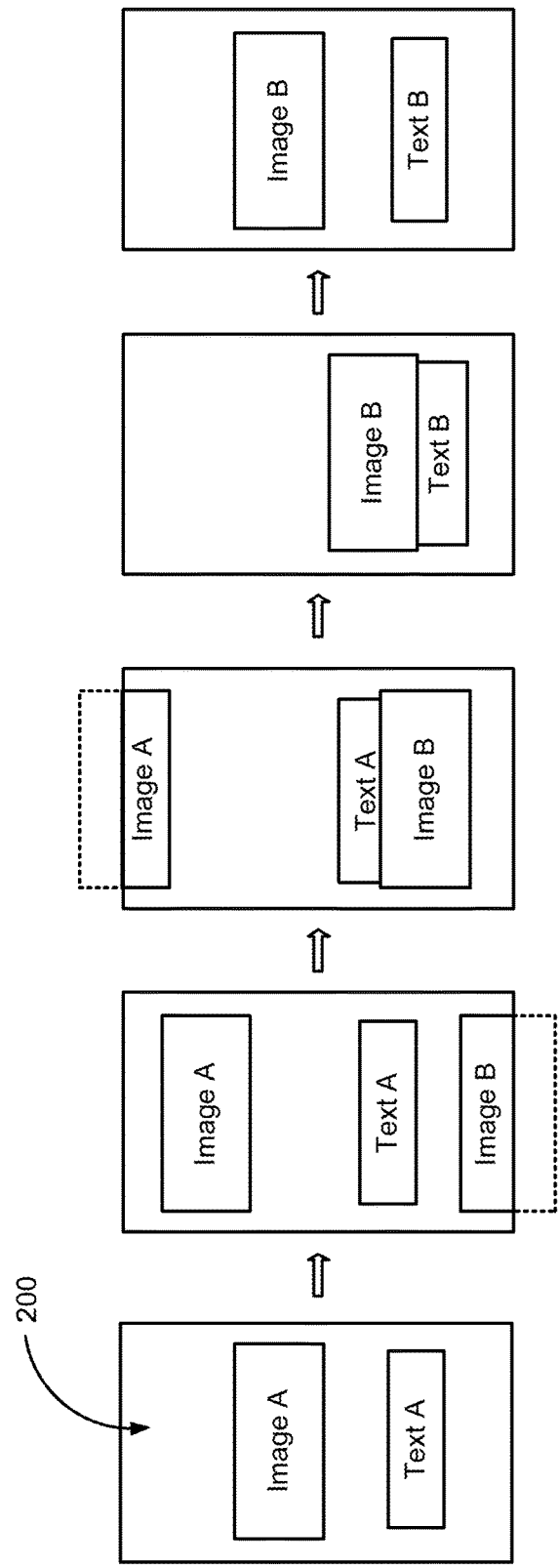
FIG. 2 is an illustration of an animation of the scrolling between the first and second pages of FIG. 1, according to one embodiment.

FIG. 2 is an illustration of an animation of the scrolling between the first and second pages of FIG. 1, according to one embodiment. In one embodiment, image A moves entirely off of the screen 200 while image B moves from entirely off-screen to its position on the page. In one embodiment, image A and image B move at the same rate. In another embodiment, text A moves at a different rate than image A (e.g. text A moves at ¼ of the rate of image A). Text A moves across a portion of the screen 200 until it is covered by image B. In another embodiment, text A does not move, but it still covered as image B moves up the screen 200. In yet another embodiment, text A gradually fades out (e.g. decreases in opacity), but not entirely, as it is covered by image B.

As image B continues moving, it reveals text B. In one embodiment, as image B moves to its position on the page, text B moves to its position on the page at a different rate (e.g. at the same reduced rate as text A). In another embodiment, text B does not move, but is instead already in its position on the page when it is revealed by image B. In yet another embodiment, text B gradually fades in (e.g. increases in opacity), as it is revealed by image B. By way of illustration, the movement of the images and text is in along a vertical axis of the screen 200, but movement along a horizontal axis is also envisioned.

In one embodiment, the first and second pages do not contain image content. In this embodiment, during the scrolling action, the first page text moves across a portion of the screen 200 and fades out (e.g. decreases from 100% to 0% opacity) while the second page text moves the same distance across the screen 200 and fades in (e.g. increases from 0% to 100% opacity).

Figure 3:
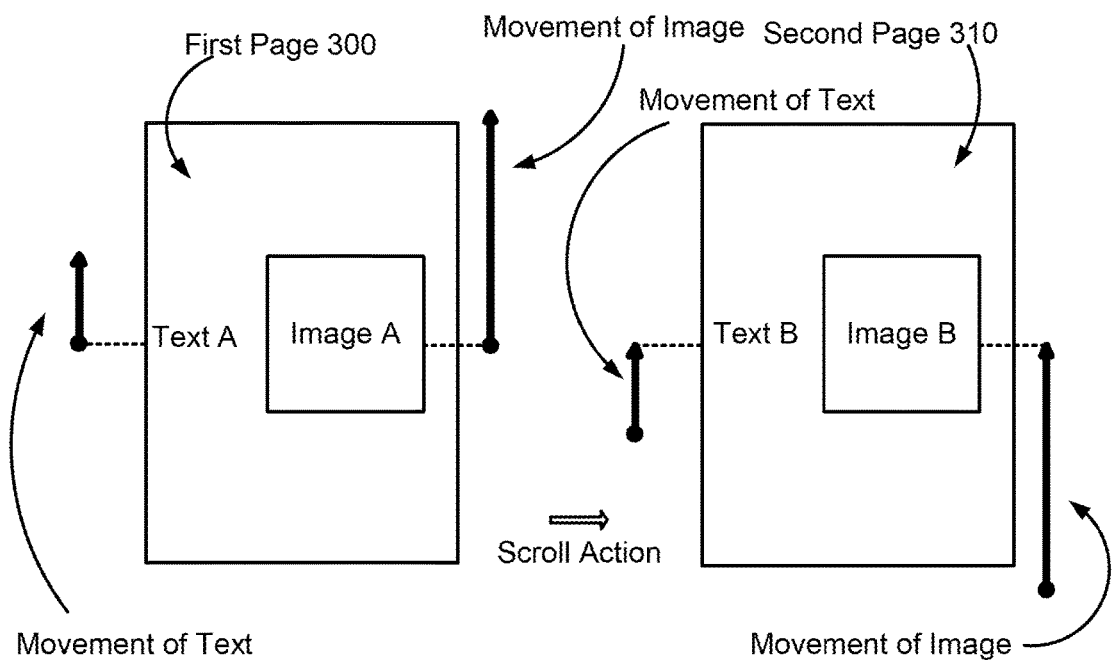
FIG. 3 is an illustration of first and second pages, each page containing text and image content, the first page scrollable to the second page, according to another embodiment.

FIG. 3 is an illustration of a first page 300 and second page 310, each page containing text and image content, the first page scrollable to the second page, according to another embodiment. In one embodiment, text and image content is displayed such that the text is not obscured by the images during scrolling (e.g. the text and images in the page layout are side by side as shown in FIG. 3). In this embodiment, the images move the entire length of the screen, while the text moves a portion of the entire length. For example, as image A moves to the top of the screen, image B moves from the bottom of the screen at the same rate. As the images move, text A moves at a slower rate than image A (e.g. 50% of the rate of image A) and text A fades out (e.g. decreases from 100% to 0% opacity). Text B moves at the same rate as text A and fades in (e.g. increases from 0% to 100% opacity) as it moves into its position on the page.

System Architecture and Implementation

Figure 4:
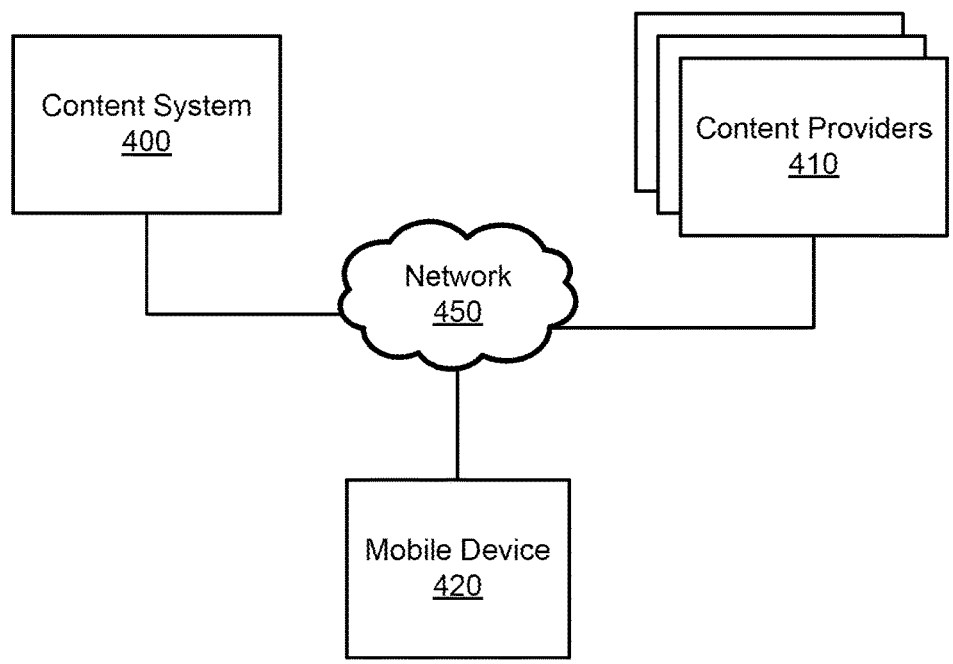
FIG. 4 illustrates a network environment of a system for delivering content to a user, according to one embodiment.

FIG. 4 illustrates a network environment of a system for delivering content to a user, according to one embodiment. In one embodiment, the network environment includes a content system 400, content providers 410, a mobile device 420, and a network 450.

A content provider 410 is a computing system capable of providing various types of content to a mobile device 420. Examples of content provided by a content provider 410 include text, images, video, or audio on web pages, web feeds, social networking information, messages, or other suitable data. Additional examples of content include user-generated content such as blogs, tweets, shared images, video or audio, social networking posts, and social networking status updates. Content provided by a content provider 410 may be received from a publisher (e.g., stories about news events, product information, entertainment, or educational material) and distributed by the content provider, or a content provider may be a publisher of content it generates. For convenience, content from a content provider 410, regardless of its composition, may be referred to herein as an "article," a "content item," or as "content." A content item may include various types of content, such as text, images, and video.

The content providers 410 communicate with the mobile device 420 and the content system 400 via a network 450, which may comprise any combination of local area and/or wide area networks, using both wired and/or wireless communication systems. In one embodiment, the network 450 uses standard communications technologies and/or protocols. For example, the network 450 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 450 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 450 may be represented using any suitable format, such as hypertext markup language (HTML) or extensible markup language (XML). In some embodiments, all or some of the communication links of the network 450 may be encrypted using any suitable technique or techniques.

The mobile device 420 is one or more computing devices capable of receiving user input as well as transmitting and/or receiving data via the network 450. The mobile device 420 is a device having computer functionality, such as a personal digital assistant (PDA), a mobile telephone, a smartphone, or another suitable device, which allows users to interact with the content system 400. The mobile device 420 retrieves pages of content from the content system 400 in response to user inputs received at the mobile device. While FIG. 4 shows a single mobile device 420, in various embodiments, any number of mobile devices may communicate with the content system 400.

The content system 400 receives content items from one or more content providers 410, generates pages in a digital magazine by processing the received content, and provides the pages to the mobile device 420. The content system 400 generates one or more pages for presentation to a user based on content items obtained from one or more content providers 410 and information describing organization and presentation of content items. For example, the content system 400 determines a page layout specifying positioning of content items relative to each other based on information associated with a user and generates a page including the content items arranged according to the determined layout for presentation to the user via the mobile device 420. This allows the user to access content items via the mobile device 420 in a format that enhances the user's interaction with and consumption of the content items. For example, the content system 400 provides a user with content items in a format similar to the format used by print magazines. By presenting content items in a format similar to a print magazine, the content system 400 allows a user to interact with content items from multiple content providers 410 via the mobile device 420 with less inconvenience from horizontally or vertically scrolling to access various content items. The scrolling animation could be implemented in a native (mobile) application environment, or on the web (desktop or mobile web). It may be particularly useful for the web, where scrolling is widely used, since a useful way to scroll between discrete content pages is provided.

In one embodiment, the scrolling actions are implemented in an HTML5 environment. In another embodiment, the scrolling actions are implemented using an immediate mode drawing application programming interface (IMDAPI) (e.g., Canvas). In some cases, implementation in an IMDAPI has advantages of using less memory, and accordingly improves performance. In one embodiment, a drawing module of the content system or mobile device creates a render layer, which contains parameters of a graphical user interface (e.g.

position coordinates). Using the drawing module, content layers (e.g. image and text layers) can be composed with the render layer to build a render tree corresponding to a graphical user interface. Content layers also include parameters (e.g., position coordinates). Using the render tree, the drawing module draws a graphical user interface according to the parameters. During a scrolling action, a scrolling momentum is computed for each graphical layer represented in the render tree, and the position coordinates for each layer are updated in the render tree. The drawing module draws the graphical user interface according to the updated parameters. In one embodiment, drawing may occur in an off-screen environment and stored in a memory cache (e.g. bitmap). In this embodiment, performance is further improved because the cached drawing may be used to redraw the layers during a scrolling action using less memory. A particular implementation of an embodiment using an IMDAPI is described in the attached Appendix.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for displaying content to a user on a display screen of a device, the method comprising:
   displaying a first page of content, the first page of content including text and at least one image;
   receiving a user input to scroll from the first page of content to a second page of content, the second page of content including text and at least one image;
   responsive to the received user input,
      simultaneously moving the images of the first page of content off of the display screen while moving the text of the first page of content a portion of the display screen, wherein the images of the first page of content move faster than the text of the first page of content,
      covering the text of the first page of content with the moving image of the second page of content,
      adding the text of the second page of content on the display screen, and
      simultaneously moving the images of the second page of content onto the display screen from off of the display screen while moving the text of the second page of content page of content a portion of the display screen, wherein the images of the second page of content move faster than the text of the second page of content.

2. The method of claim 1, further comprising:
   responsive to the received user input, reducing the opacity of the text of the first page of content while moving the text of the first page of content.

3. The method of claim 1, further comprising:
   responsive to the received user input, increasing the opacity of the text of the second page of content while moving the text of the first page of content.

4. The method of claim 1, wherein the images and the text of the first and second pages of content move along a vertical axis of the display screen.

5. The method of claim 1, wherein adding the text of the second page of content on the display screen comprises revealing the text of the second page of content with the moving image of the second page of content.

6. The method of claim 1, wherein adding the text of the second page of content on the display screen comprises fading in the text of the first page of content.

7. The method of claim 1, wherein the first and second pages of content are displayed on a web page.

8. The method of claim 1, wherein the first and second pages of content are obtained from a remote digital magazine service.

9. A non-transitory computer readable medium comprising instructions that when executed by a processor cause the processor to:
   display a first page of content, the first page of content including text and at least one image;

receive a user input to scroll from the first page of content to a second page of content, the second page of content including text and at least one image;

responsive to the received user input, simultaneously move the images of the first page of content off of the display screen while moving the text of the first page of content a portion of the display screen, wherein the images of the first page of content move faster than the text of the first page of content, covering the text of the first page of content with the moving image of the second page of content, add the text of the second page of content on the display screen, and simultaneously move the images of the second page of content onto the display screen from off of the display screen while moving the text of the second page of content page of content a portion of the display screen, wherein the images of the second page of content move faster than the text of the second page of content.

10. The non-transitory computer readable medium of claim 9, further comprising instructions that cause the processor to:

responsive to the received user input, reduce the opacity of the text of the first page of content while moving the text of the first page of content.

11. The non-transitory computer readable medium of claim 9, further comprising instructions that cause the processor to:

responsive to the received user input, increase the opacity of the text of the second page of content while moving the text of the first page of content.

12. The non-transitory computer readable medium of claim 9, wherein the images and the text of the first and second pages of content move along a vertical axis of the display screen.

13. The non-transitory computer readable medium of claim 9, wherein instructions that cause the processor to add the text of the second page of content on the display screen further comprise instructions that cause the processor to reveal the text of the second page of content with the moving image of the second page of content.

14. The non-transitory computer readable medium of claim 9, wherein instructions that cause the processor to add the text of the second page of content on the display screen further comprise instructions that cause the processor to fade in the text of the first page of content.

15. The non-transitory computer readable medium of claim 9, wherein the first and second pages of content are displayed on a web page.

16. The non-transitory computer readable medium of claim 9, wherein the first and second pages of content are obtained from a remote digital magazine service.

* * * * *

UNITED STATES PATENT AND TRADEMARK OFFICE
CERTIFICATE OF CORRECTION

| | |
|---|---|
| PATENT NO. | : 10,222,966 B2 |
| APPLICATION NO. | : 15/016267 |
| DATED | : March 5, 2019 |
| INVENTOR(S) | : Charles Hugo Ying et al. |

It is certified that error appears in the above-identified patent and that said Letters Patent is hereby corrected as shown below:

In the Claims

Claim 1, Column 6, Line 36, delete "page of content page of content" and insert --page of content--.

Claim 9, Column 7, Line 18, delete "page of content page of content" and insert --page of content--.

Signed and Sealed this
Twenty-seventh Day of August, 2019

Andrei Iancu
*Director of the United States Patent and Trademark Office*